US012569762B2

(12) United States Patent (10) Patent No.: US 12,569,762 B2
Nelson et al. (45) Date of Patent: Mar. 10, 2026

(54) SENSORY INTERACTIVITY MODIFICATION IN A VIRTUAL REALITY ENVIRONMENT

(71) Applicant: IGT, Las Vegas, NV (US)

(72) Inventors: Dwayne Nelson, Las Vegas, NV (US); Tanner Badalato, Henderson, NV (US)

(73) Assignee: IGT, Las Vegas, NV (US)

( * ) Notice: Subject to any disclaimer, the term of this patent is extended or adjusted under 35 U.S.C. 154(b) by 259 days.

(21) Appl. No.: 18/359,184

(22) Filed: Jul. 26, 2023

(65) Prior Publication Data

US 2025/0032919 A1     Jan. 30, 2025

(51) Int. Cl.
*A63F 13/525*      (2014.01)
*A63F 13/285*      (2014.01)
*G07F 17/32*       (2006.01)

(52) U.S. Cl.
CPC .......... *A63F 13/525* (2014.09); *A63F 13/285* (2014.09); *G07F 17/3211* (2013.01); *A63F 2300/8082* (2013.01)

(58) Field of Classification Search
CPC .................. A63F 13/525; A63F 13/285; A63F 2300/8082; A63F 13/25; G07F 17/3211
USPC ....................................................... 463/3, 30
See application file for complete search history.

(56) References Cited

U.S. PATENT DOCUMENTS

| | | | | |
|---|---|---|---|---|
| 12,073,054 | B2 * | 8/2024 | Terre ...................... | G06F 3/0481 |
| 12,079,442 | B2 * | 9/2024 | Berliner ............... | A63F 13/577 |
| 12,099,696 | B2 * | 9/2024 | Levi ...................... | G06F 3/0489 |
| 12,112,012 | B2 * | 10/2024 | Berliner ............... | A63F 13/577 |
| 12,141,416 | B2 * | 11/2024 | Berliner ............... | G06F 3/0481 |
| 2024/0112427 | A1 * | 4/2024 | Berliner ................. | G06F 3/011 |
| 2024/0112428 | A1 * | 4/2024 | Levi ...................... | G06T 19/006 |
| 2024/0361878 | A1 * | 10/2024 | Berliner ................. | G06T 19/00 |

* cited by examiner

*Primary Examiner* — Pierre E Elisca
(74) *Attorney, Agent, or Firm* — Sage Patent Group

(57) ABSTRACT

A processor circuit provides a real-time environmental model of a shared virtual environment (SVE) comprising a plurality of virtual persons in a virtual gaming environment. Display data corresponding to the SVE to a first player device worn by a first player is transmitted, including user display data that causes a display device in the first player device to render a portion of the SVE from a point of view (POV) of the first player based on a virtual orientation of the first player device and a virtual location of the first player in the SVE. Based on a determined player status of the second player, a sensory interactivity parameter of the second player is modified to modify at least one of a visibility, an audibility, and a tangibility a second player avatar associated with the second player in the SVE in the POV of the first player.

20 Claims, 19 Drawing Sheets

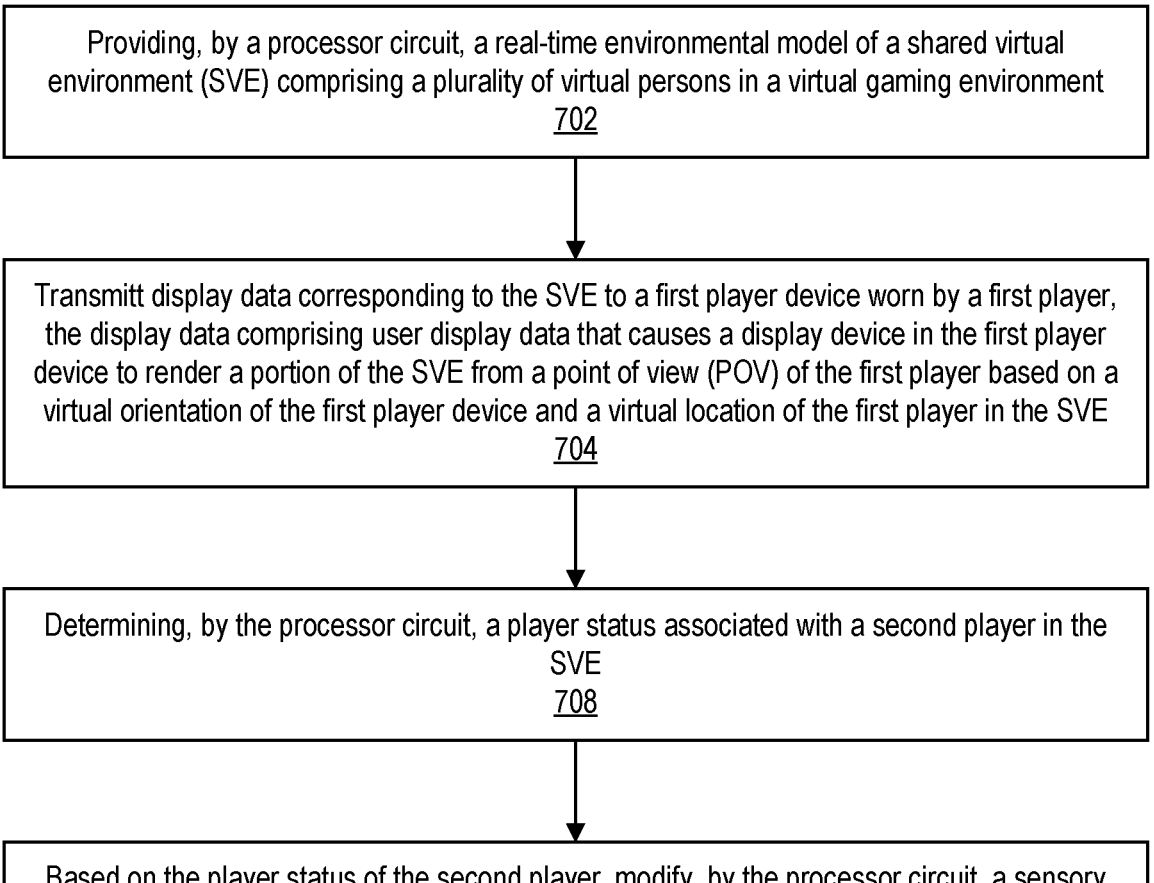

700

> Providing, by a processor circuit, a real-time environmental model of a shared virtual environment (SVE) comprising a plurality of virtual persons in a virtual gaming environment
> 702

> Transmitt display data corresponding to the SVE to a first player device worn by a first player, the display data comprising user display data that causes a display device in the first player device to render a portion of the SVE from a point of view (POV) of the first player based on a virtual orientation of the first player device and a virtual location of the first player in the SVE
> 704

> Determining, by the processor circuit, a player status associated with a second player in the SVE
> 708

> Based on the player status of the second player, modify, by the processor circuit, a sensory interactivity parameter of the second player to modify at least one of a visibility, an audibility, and a tangibility a second player avatar associated with the second player in the SVE in the POV of the first player.
> 706

*FIG. 7*

SENSORY INTERACTIVITY MODIFICATION IN A VIRTUAL REALITY ENVIRONMENT

BACKGROUND

Embodiments described herein relate to virtual reality environments, and in particular to modification of sensory interactivity parameters in a virtual reality gaming environment, such as a virtual casino environment, and related devices, systems, and methods. As the adoption of virtual reality (VR) technology becomes more widespread, many companies are developing persistent virtual worlds that include simulated and/or enhanced reproductions of real-world locations, including gaming environments such as casinos for example. There is a need to populate these worlds with virtual persons to provide a more realistic and desirable experience for users.

BRIEF SUMMARY

According to some embodiments, a system includes a processor circuit and a memory including machine-readable instructions that, when executed by the processor circuit, cause the processor circuit to provide a real-time environmental model of a shared virtual environment (SVE) comprising a plurality of virtual persons in a virtual gaming environment. The instructions further cause the processor circuit to transmit display data corresponding to the SVE to a first player device worn by a first player, the display data comprising user display data that causes a display device in the first player device to render a portion of the SVE from a point of view (POV) of the first player based on a virtual orientation of the first player device and a virtual location of the first player in the SVE. The instructions further cause the processor circuit to determine a player status associated with a second player in the SVE. The instructions further cause the processor circuit to, based on the player status of the second player, modify a sensory interactivity parameter of the second player to modify at least one of a visibility, an audibility, and a tangibility a second player avatar associated with the second player in the SVE in the POV of the first player.

According to some embodiments, a wearable gaming device includes a frame, a display device coupled to the frame to dispose the display device in a field of view (FOV) of a first player, a processor circuit, and a memory including machine-readable instructions that, when executed by the processor circuit, cause the processor circuit to provide a real-time environmental model of a shared virtual environment (SVE) comprising a plurality of virtual persons in a virtual gaming environment. The instructions further cause the processor circuit to receive display data corresponding to the SVE, the display data comprising user display data that causes the display device to render a portion of the SVE from a point of view (POV) of the first player based on a virtual orientation of the frame and a virtual location of the first player in the SVE. The instructions further cause the processor circuit to determine a player status associated with a second player in the SVE. The instructions further cause the processor circuit to, based on the player status of the second player, modify a sensory interactivity parameter of the second player to modify at least one of a visibility, an audibility, and a tangibility a second player avatar associated with the second player in the SVE in the POV of the first player.

According to some embodiments, a method includes providing, by a processor circuit, a real-time environmental model of a shared virtual environment (SVE) comprising a plurality of virtual persons in a virtual gaming environment. The method further includes transmitting display data corresponding to the SVE to a first player device worn by a first player, the display data comprising user display data that causes a display device in the first player device to render a portion of the SVE from a point of view (POV) of the first player based on a virtual orientation of the first player device and a virtual location of the first player in the SVE. The method further includes determining, by the processor circuit, a player status associated with a second player in the SVE. The method further includes, based on the player status of the second player, modify, by the processor circuit, a sensory interactivity parameter of the second player to modify at least one of a visibility, an audibility, and a tangibility a second player avatar associated with the second player in the SVE in the POV of the first player.

BRIEF DESCRIPTION OF SEVERAL VIEWS OF THE DRAWINGS

FIG. 7 is a flowchart illustrating operations of systems/methods of facilitating embodiments disclosed herein, according to some embodiments.

DETAILED DESCRIPTION

Figure 1:
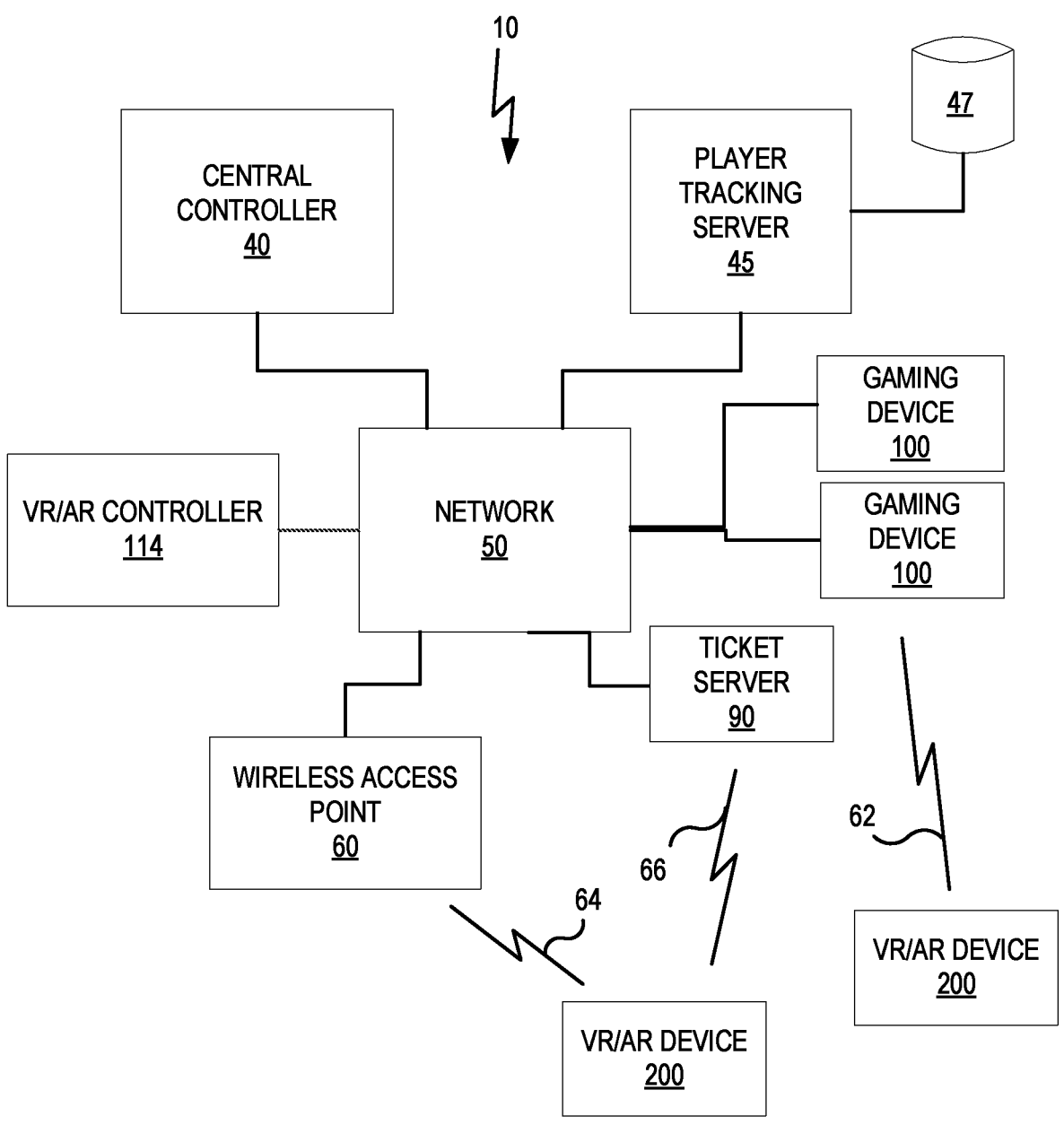
FIG. 1 is a schematic block diagram illustrating a network configuration for a plurality of gaming devices according to some embodiments.

Embodiments described herein relate to virtual reality environments, and in particular to assignment of live dealers in a virtual reality gaming environment, such as a virtual casino environment, and related devices, systems, and methods. For example, in some embodiments, a virtual play session of a virtual table game is initiated for a player of the virtual table game, the virtual table game comprising a dealer avatar, and it is determined whether a player status of the player meets a predetermined threshold. Based on the player status meeting the predetermined threshold, the dealer avatar may be associated with a live dealer to control the dealer avatar and, based on the player status failing to meet the predetermined threshold, the dealer avatar may be associated with a software bot to autonomously control the dealer avatar.

The software bot may comprise a VR dealer whose behavior is controlled by a computer algorithm, artificial intelligence, machine learning and/or scripts, etc. The software bot can talk and interact with players, operate a table game (poker, baccarat, craps, roulette, etc.). The live dealer, i.e., a real person, may be represented by the dealer avatar, and may be controlled by the live dealer using a VR device or computer. The live dealer can also run and operate the VR table game using their computing device and may also communicate and interact with players via the dealer avatar. Embodiments describe how and when a live dealer and/or software bot is assigned to a table or to a player in a VR casino. An assignment event may occur to assign a type of dealer, and may also assign one or more attributes of the dealer, such as particular appearances, behaviors, and or abilities for the dealer avatar, for example. For example, a live dealer may be assigned to high rollers and software bots may be assigned to other players. The assignment event may occur when a player enters a casino or visits a table, for example. The assignment event may take any number of criteria into account, such as the player's loyalty club status, the player's preference (e.g., attributes of the dealer such as appearance, gender, height, music selection, possible actions), availability of a preferred live dealer of the player, the player's play history, the player's wagering account balance, ticket balance, VR casino balance, etc., an activity level in the casino (e.g., assigning software bots to new visitors when live dealers are not available), a game/table type. Assignments may occur randomly, on a time schedule (e.g., every 15 minutes), after a certain number of games have been played by the player, after a certain amount of money has been wagered, won and/or lost, etc. In some examples assignment events may occur when a virtual table opens, which may occur during certain time periods. For example, a casino typically manages the number of open tables to be roughly aligned with the table demand from players, e.g., a casino may only open ten tables on a Tuesday evening (shift starting at 4 pm), or 30 tables on a Saturday evening, (shift starting at 4 pm). In some examples, VR players may roam the casino and search for tables with the game, bet parameters, occupancy, and dealer that matches their interests. For example, some of these opened tables may have software bot dealers, while others may have live dealers.

Before discussing these and other embodiments in greater detail, reference will be made to an example of a gaming system for implementing embodiments disclosed herein. In this regard, FIG. 1 illustrates a gaming system 10 including a plurality of gaming devices 100 is illustrated. As discussed above, the gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

The wireless interfaces 62, 66 allow a plurality of virtual reality (VR) and/or augmented reality (AR) devices, referred to herein as VR/AR devices 200, to coordinate the generation and rendering of VR and/or AR images to the player. As used herein, VR/AR devices 200 may include VR and/or AR functionality, as desired. In some embodiments, the gaming system 10 includes a VR/AR controller 114. The VR/AR controller 114 may be a computing system that communicates through the data communication network 50 with the gaming devices 100 and the VR devices 200 to coordinate the generation and rendering of virtual images to one or more players using the VR devices 200. The VR/AR controller 114 may be implemented within or separately from the central controller 40.

In some embodiments, the VR/AR controller 114 may coordinate the generation and display of the virtual images of the same virtual object to more than one player by more than one VR/AR device 200. As described in more detail below, this may enable multiple players to interact with the same virtual object together in real time. This feature can be used to provide a shared multiplayer experience to multiple players at the same time.

Moreover, in some embodiments, the VR/AR controller 114 may coordinate the generation and display of the same virtual object to players at different physical locations, as will be described in more detail below.

The VR/AR controller 114 may store a three-dimensional wireframe map of a gaming area, such as a casino floor, and may provide the three-dimensional wireframe map to the VR/AR devices 200. The wireframe map may store various information about EGMs in the gaming area, such as the identity, type and location of various types of EGMs. The three-dimensional wireframe map may enable a VR/AR device 200 to more quickly and accurately determine its position and/or orientation within the gaming area, and also may enable the VR/AR device 200 to assist the player in navigating the gaming area while using the VR/AR device 200. The generation of three-dimensional wireframe maps is described in more detail below.

In some embodiments, at least some processing of virtual images and/or objects that are rendered by the VR devices 200 may be performed by the VR/AR controller 114, thereby offloading at least some processing requirements from the VR devices 200.

Figure 2A:
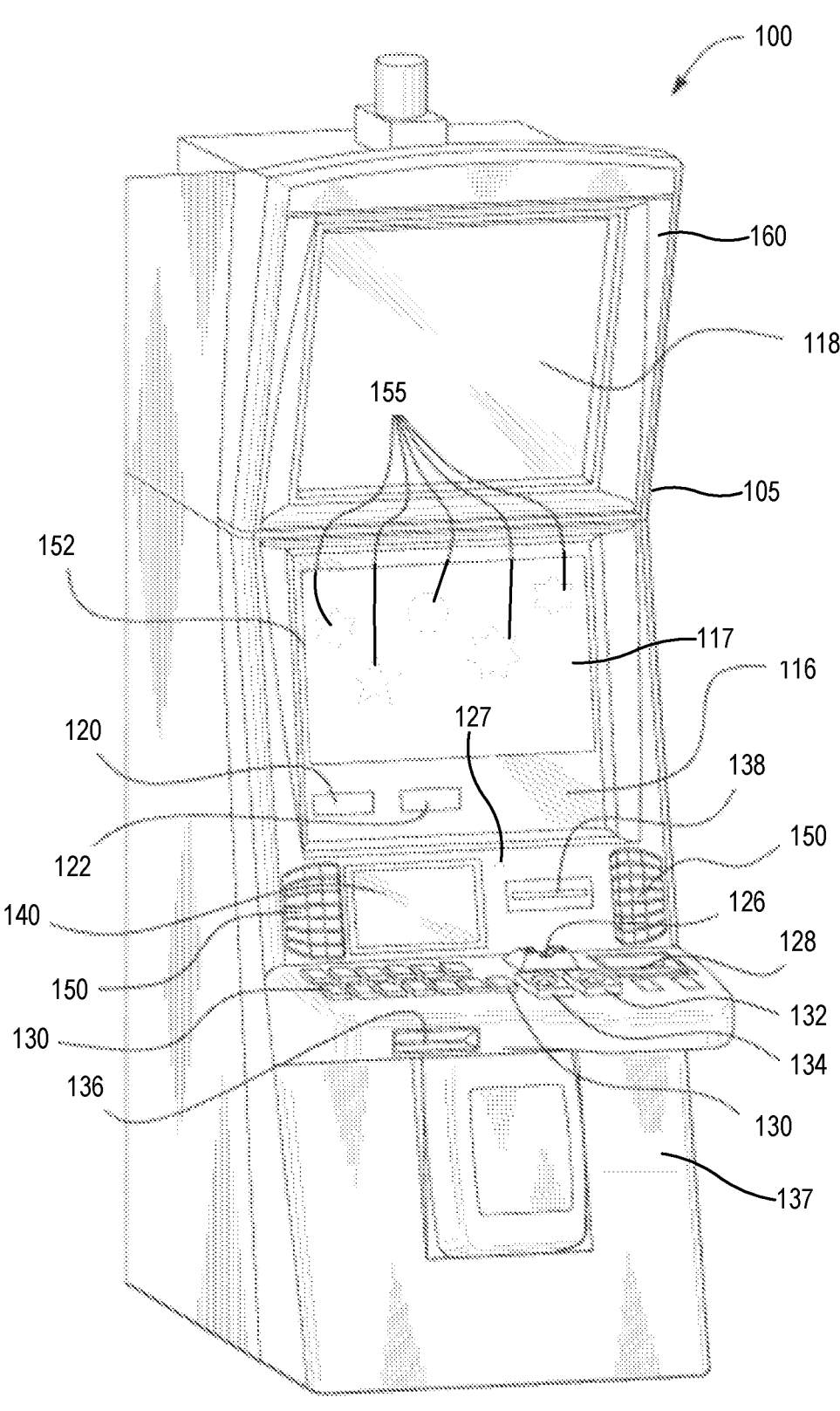
FIG. 2A is a perspective view of a gaming device that can be configured according to some embodiments.
Figure 2B:
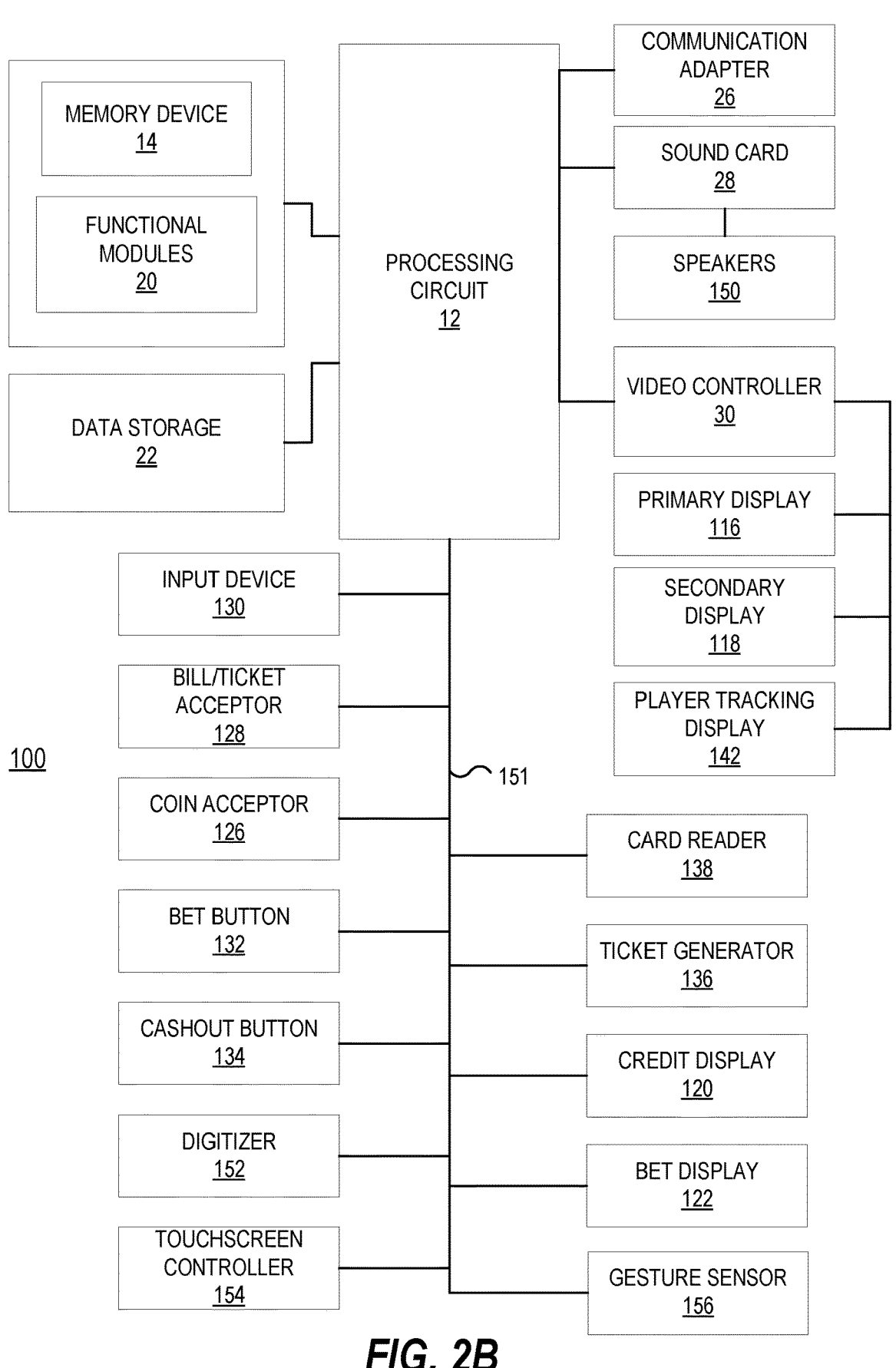
FIG. 2B is a schematic block diagram illustrating an electronic configuration for a gaming device according to some embodiments.
Figure 2C:
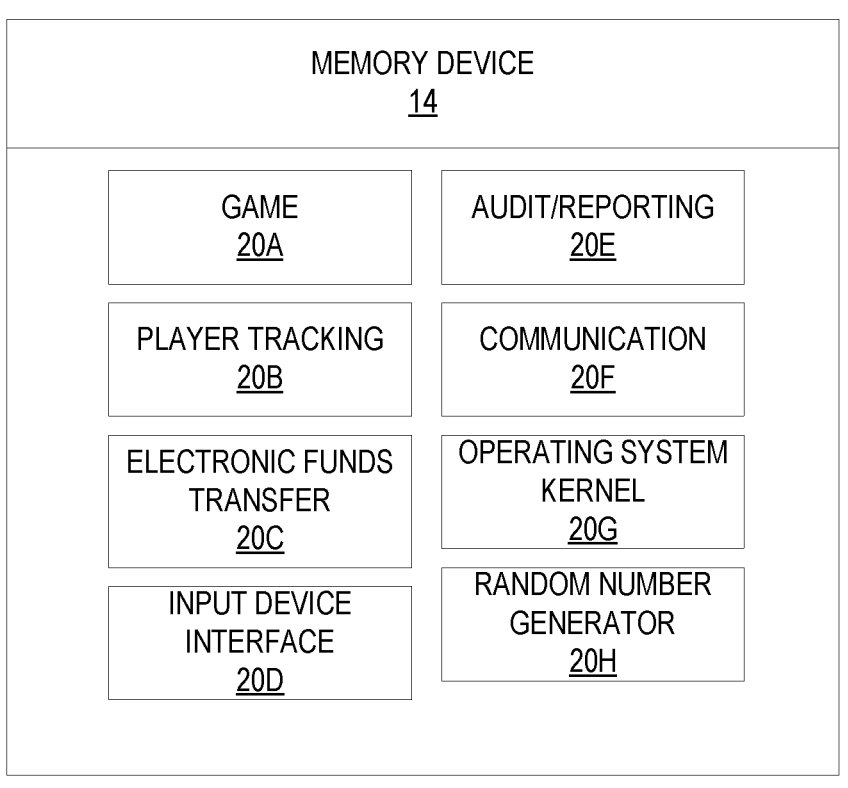
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
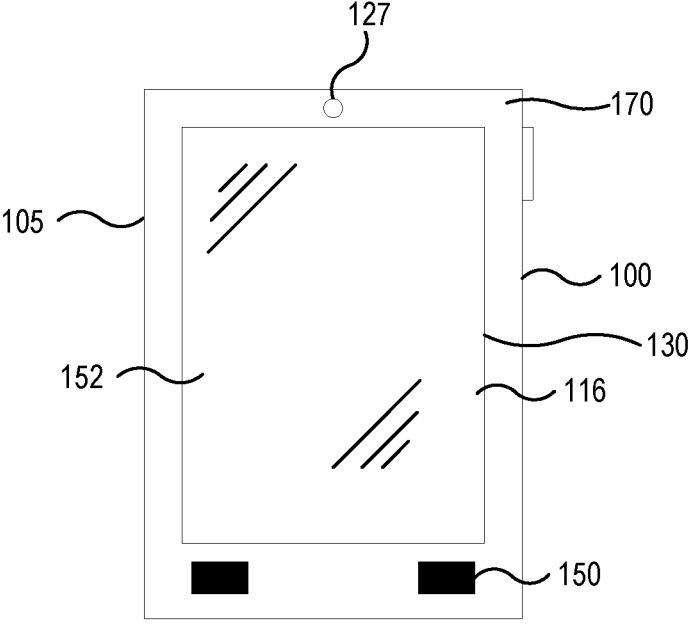
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
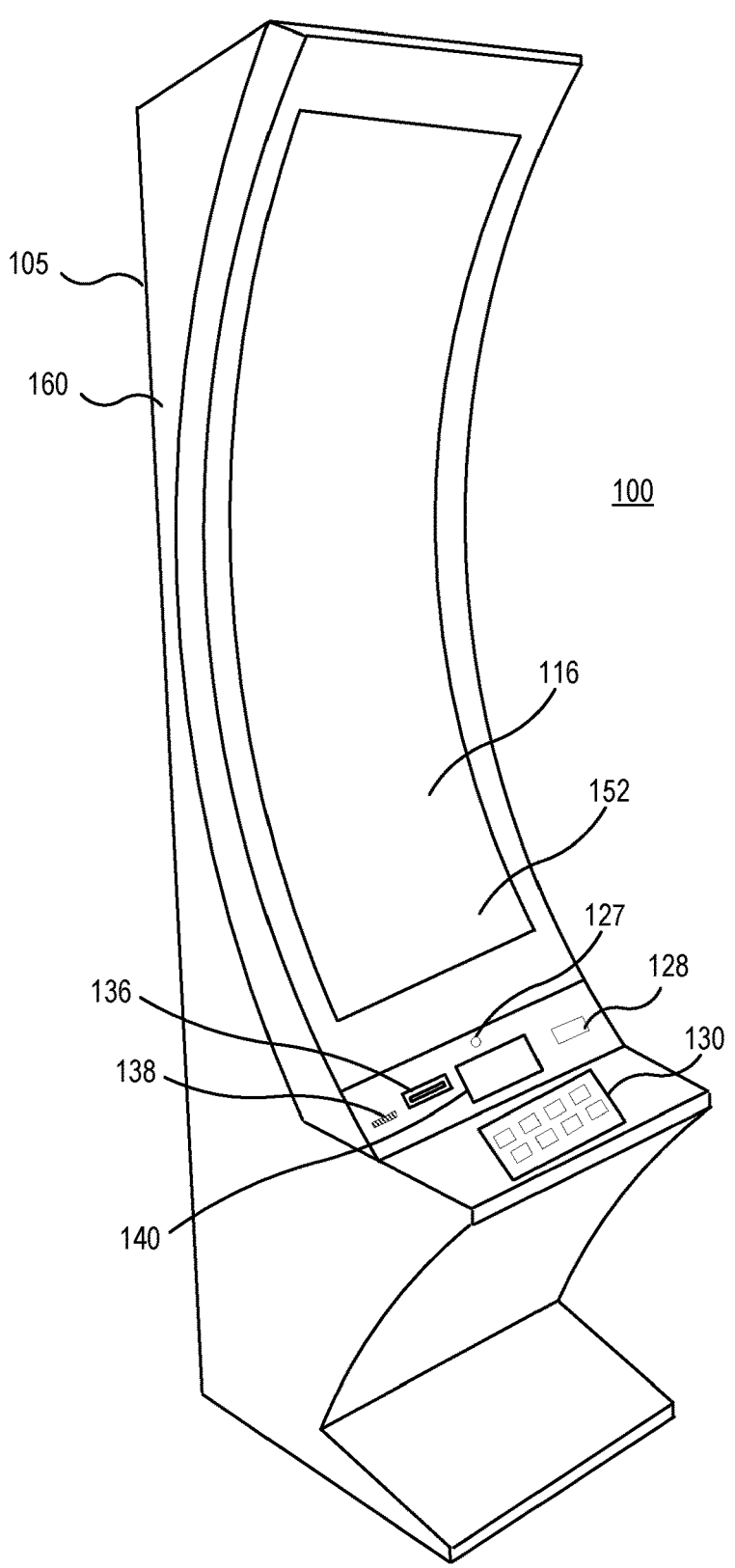
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Figure 2F:
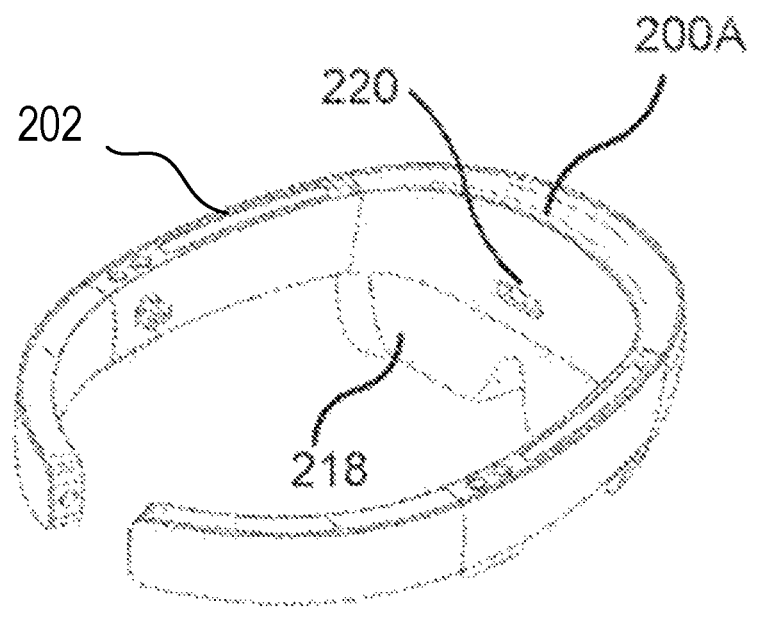
FIGS. 2F and 2G illustrate VR/AR devices according to various embodiments.

FIG. 2F illustrates a virtual reality (VR) viewer 200A implemented as a 3D headset including a pair of displays 218 on which images of virtual objects may be displayed. The viewer 200A includes a head-wearable frame 202, with the displays 218 coupled to the frame 202 to position the display device in a field of view of user wearing the viewer 200A. Different stereoscopic images may be displayed on the displays 218 to create an appearance of depth. The VR viewer 200A may include a plurality of sensors 220 that the device uses to determine a position, orientation, and/or movement of the viewer 200A, which may be used to determine a position, orientation, and/or direction of movement within an SVE.

The viewer 200A may further include other sensors, such as a gyroscopic sensor, a GPS sensor, one or more accelerometers, and/or other sensors that allow the viewer 200A to determine its position and orientation in space. In some embodiments, the viewer 200A may include one or more cameras that allow the viewer 200A to determine its position and/or orientation in space using visual simultaneous localization and mapping (VSLAM). viewer 200A may further include one or more microphones and/or speakers that allow the user to interact audially with the device.

In some embodiments, a viewer may also include semi-transparent lenses that allow the user to see both the real world as well as the 3D image rendered on the lenses, e.g., to provide an augmented reality (AR) experience. The viewer may also include additional cameras or other sensors to obtain a live video signal for building a 3D model of the space around the user. The viewer may also generate a 3D image of an object to display to the user that takes into account the real-world objects around the user and allows the user to interact with the 3D object.

Figure 2G:
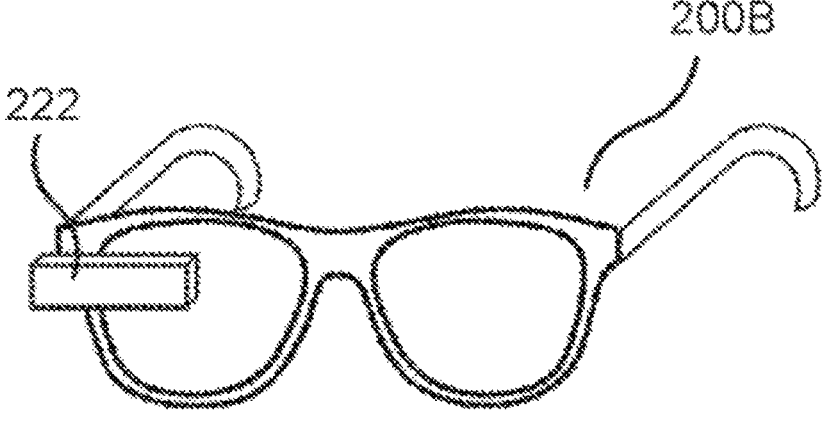

Referring to FIG. 2G, an augmented reality (AR) viewer 200B may be implemented as a pair of glasses including a transparent prismatic display 222 that displays an image to a single eye of the user. Such a device may be capable of displaying images to the user while allowing the user to see the world around the user, and as such can be used as an AR device.

In other embodiments, a VR and/or AR viewer may be implemented using a virtual retinal display device that raster scans an image directly onto the retina of the user. In still further embodiments, a VR and/or AR viewer may be implemented using a mobile wireless device, such as the mobile gaming device 170 of FIG. 2D above, a mobile telephone, a tablet computing device, and/or a personal digital assistant, etc.

Although illustrated as certain gaming devices, such as electronic gaming machines (EGMs), mobile gaming devices, VR/AR headsets, etc., functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3A:
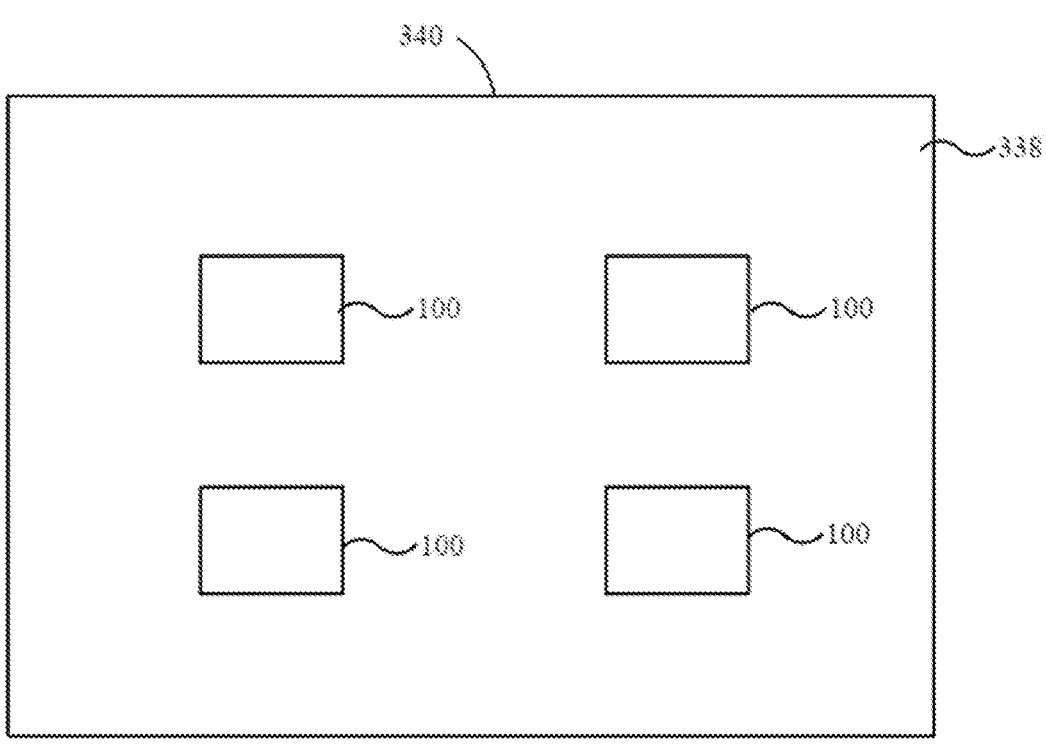
FIG. 3A is a map of a gaming area, such as a casino floor, according to some embodiments.

FIG. 3A illustrates, in plan view, an example map 338 of a gaming area 340. The gaming area 340 may, for example, be a casino floor. The map 338 shows the location of a plurality of gaming devices 100 (e.g., EGMs) within the gaming area 340. As will be appreciated, the locations of the gaming devices 100 within a gaming area 340 are generally fixed, although EGMs may be relocated from time to time, such as when new EGMs are introduced, to create new traffic flow patterns within the gaming area 340, to feature or highlight certain games, etc. As noted above, in order to assist the operation of the VR devices 200, the VR/AR controller 114 may store a three-dimensional wireframe map of the gaming area 340, and may provide the three-dimensional wireframe map to the VR viewers 200.

Figure 3B:
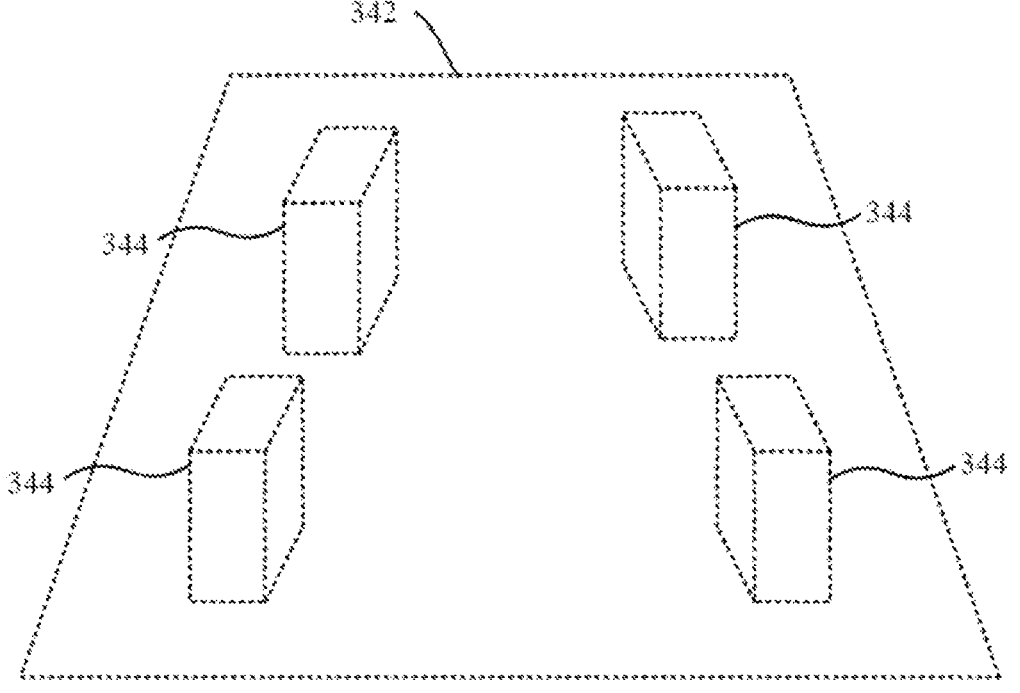
FIG. 3B is a 3D wireframe model of the gaming area of FIG. 3A, according to some embodiments.

An example of a wireframe map 342 for an SVE is shown in FIG. 3B. The wireframe map 342 is a three-dimensional model of the gaming area 340. As shown in FIG. 3B, the wireframe map 342 includes wireframe models 344 that may correspond to the gaming devices 100 that are physically in the gaming area 340. The wireframe models 344 may also be entirely or partially virtual, e.g., existing only in the wireframe model 344 for the SVE. The wireframe models 344 may be pregenerated to correspond to various EGM form factors, such as single display EGMs, mechanical slot EGMs, dual display EGMs, etc. The pregenerated models may then be placed into the wireframe map 342, for example, by a designer or other personnel. The wireframe map 342 may be updated at any time. For example, in an example where the wireframe map 342 corresponds to a real-world gaming area 340, the wireframe map 342 may be updated whenever the physical location of EGMs in the gaming area 340 is changed.

In some embodiments, the wireframe map 342 may be generated automatically using a VR/AR device 200, such as a 3D headset, that is configured to perform a three-dimensional depth scan of its surroundings and generate a three-dimensional model based on the scan results. Thus, for example, an operator using a VR/AR device 200 may perform a walkthrough of the gaming area 340 while the VR/AR device 200 builds the 3D map of the gaming area.

The three-dimensional wireframe map 342 may enable a VR/AR device 200 to more quickly and accurately determine its position and/or orientation within the gaming area. For example, a VR/AR device 200 may determine its location within the gaming area 340 using one or more position/orientation sensors. The VR/AR device 200 then builds a three-dimensional map of its surroundings using depth scanning, and compares its sensed location relative to objects within the generated three-dimensional map with an expected location based on the location of corresponding objects within the wireframe map 342. The VR/AR device 200 may calibrate or refine its position/orientation determination by comparing the sensed position of objects with the expected position of objects based on the wireframe map 342. Moreover, in an AR implementation, the VR/AR device 200 can be aware of objects or destinations within the gaming area 340 that it has not itself scanned, because the VR/AR device 200 has access to the wireframe map 342 of the entire gaming area 340. Processing requirements on the VR/AR device 200 may also be reduced because the wireframe map 342 is already available to the VR/AR device 200.

In some embodiments, the wireframe map 342 may store various information about EGMs in the gaming area, such as the identity, type, orientation and location of various types of EGMs, the locations of exits, bathrooms, courtesy desks, cashiers, ATMs, ticket redemption machines, etc. Such information may be used by a VR/AR device 200 to help the user navigate the gaming area. For example, if a user desires to find a destination within the gaming area, the user may ask the VR/AR device 200 for directions using a built-in microphone and voice recognition function in the VR/AR device 200 or use other hand gestures or eye/gaze controls tracked by the VR/AR device 200 (instead of or in addition to voice control). The VR/AR device 200 may process the request to identify the destination, and then may display a virtual object, such as a virtual path on the ground, virtual arrow, virtual sign, etc., to help the user to find the destination. In some embodiments, for example, the VR/AR device 200 may display a halo or glow around the destination to highlight it for the user, or have virtual 3D sounds coming from it so players could more easily find the machine.

According to some embodiments, a user of a VR/AR device 200 may use the VR/AR device 200 to obtain information about players and/or EGMs on a casino gaming floor. The information may be displayed to the user on the VR/AR device 200 in a number of different ways such as by displaying images on the VR/AR device 200 that appear to be three dimensional or two-dimensional elements of the scene as viewed through the VR/AR device 200. In general, the type and/or amount of data that is displayed to the user may depend on what type of user is using the VR/AR device 200 and, correspondingly, what level of permissions or access the user has. For example, a VR/AR device 200 may be operated in one of a number of modes, such as a player mode, an observer mode or an operator mode. In a player mode, the VR/AR device 200 may be used to display information about particular EGMs on a casino floor. The information may be generic information about an EGM or may be customized information about the EGM based on the identity or preferences of the user of the VR/AR device 200. In an observer mode, the VR/AR device 200 may be used to display information about particular EGMs on a casino floor or information about players of EGMs on the casino floor. In an operator mode, the VR/AR device 200 may also be used to display information about particular EGMs on a casino floor or information about players of EGMs on the casino floor, but the information may be different or more extensive than the information displayed to an observer.

Figure 4A:
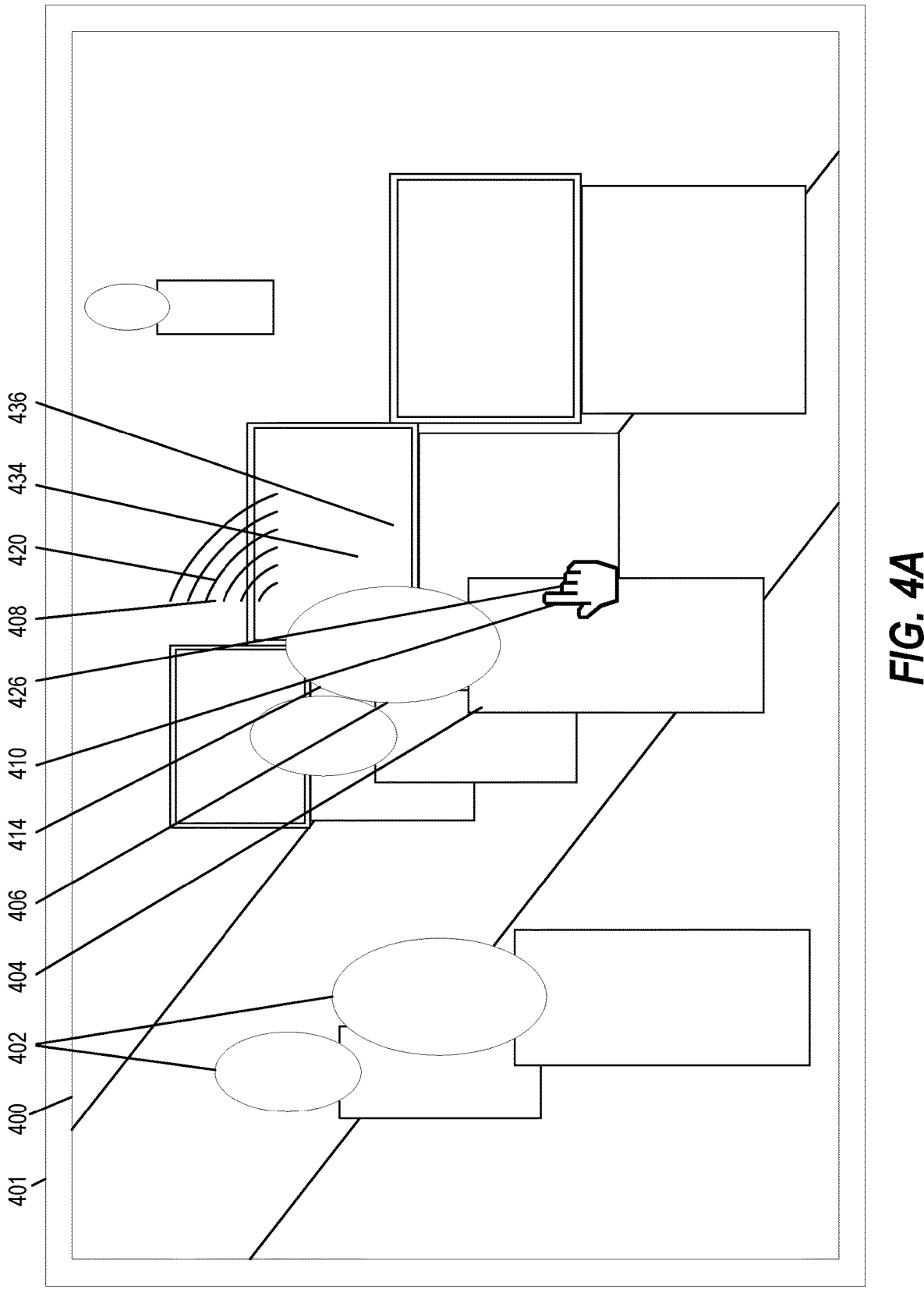
FIGS. 4A-4C are views of a shared virtual environment (SVE) being displayed on a display device of a player device, according to some embodiments.
Figure 4B:
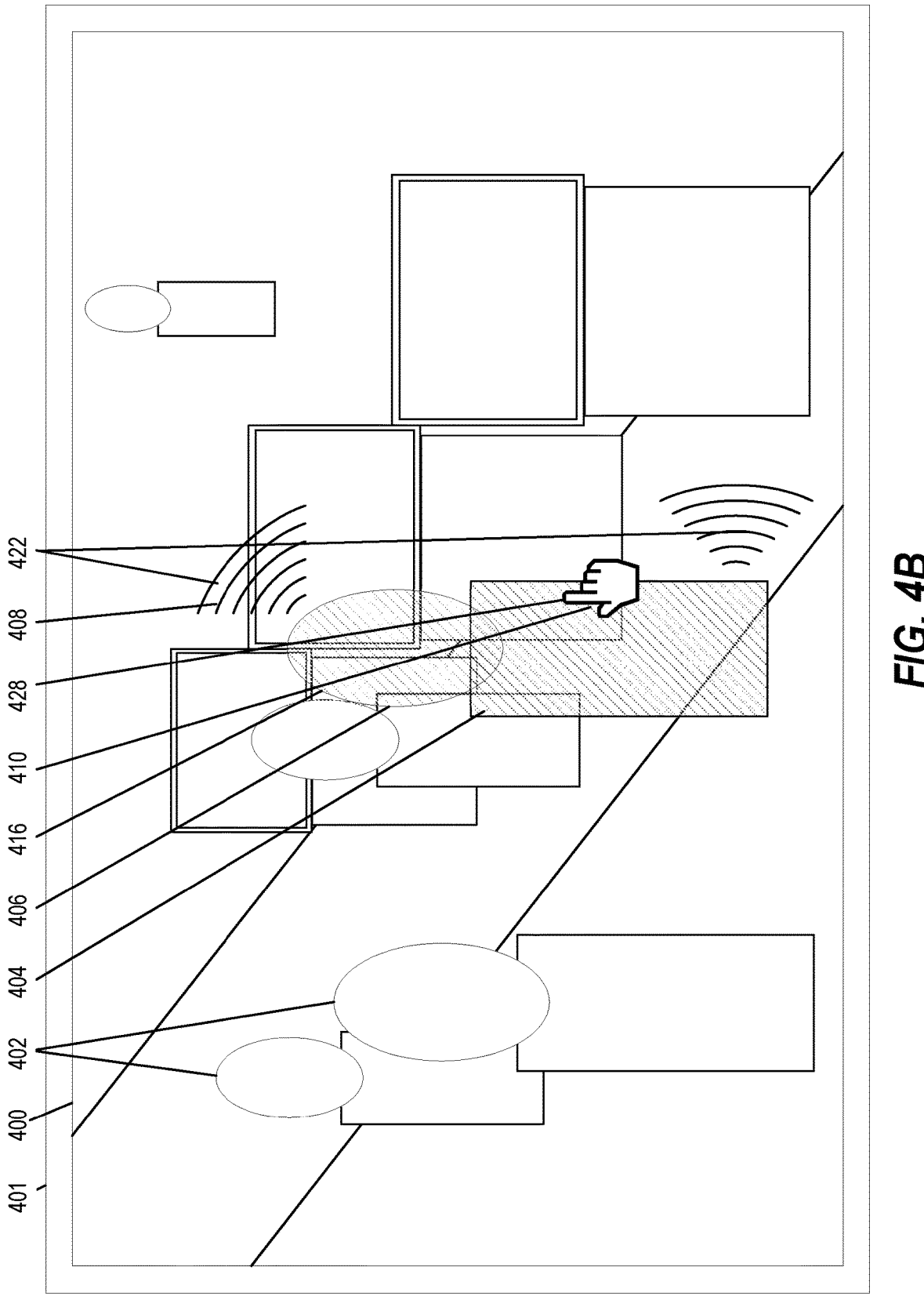
Figure 4C:
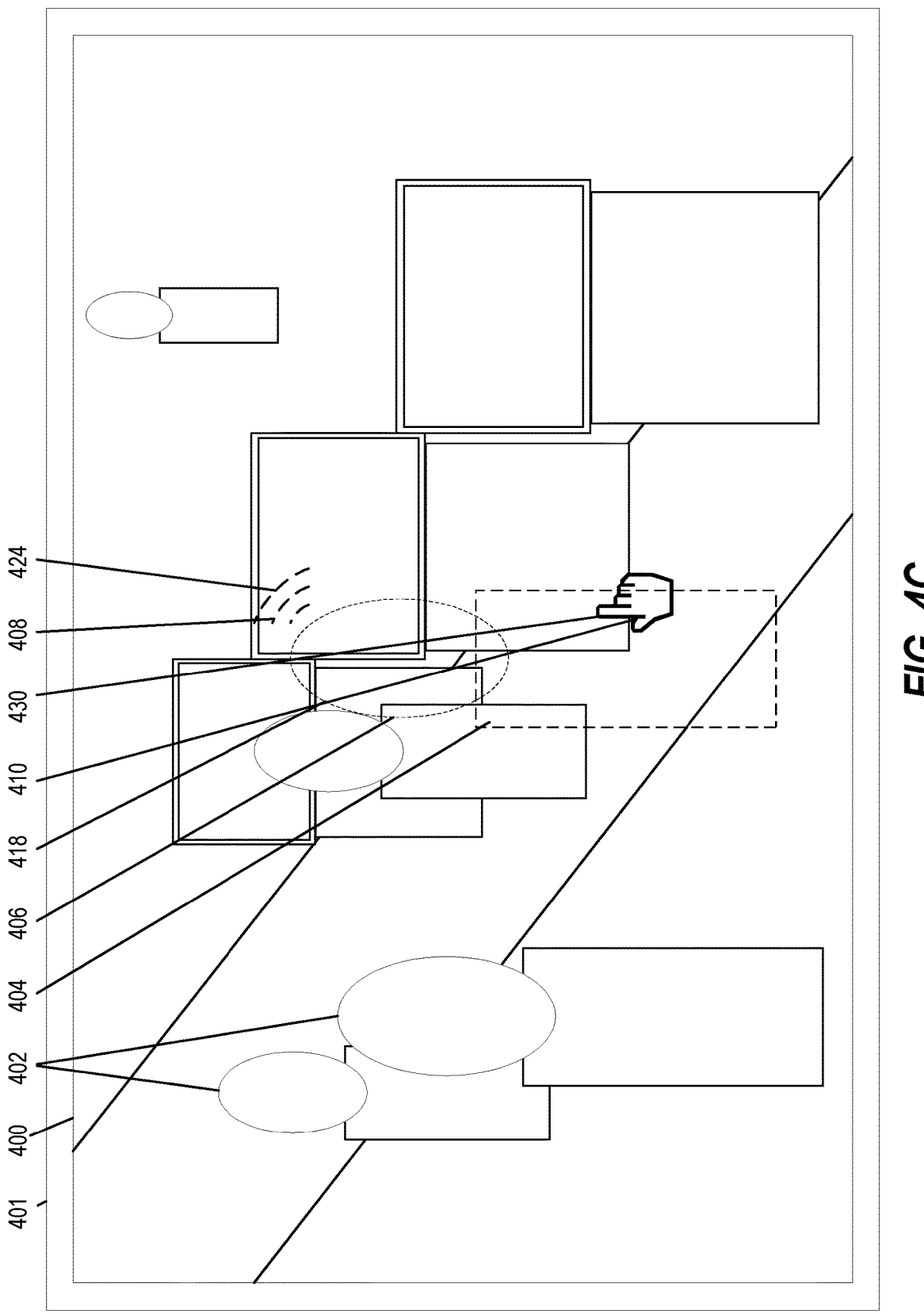

Referring now to FIG. 4A-4C, a shared virtual environment (SVE) 400 being displayed on a display device 401 of a player device is illustrated. The SVE 400 may be a real-time environmental model that includes a plurality of virtual persons 402 in a virtual gaming environment. The player device may receive display data corresponding to the SVE 400 that includes user display data that causes a display device in the first player device to render a portion of the SVE 400 from a point of view (POV) of the first player, for example, based on a virtual orientation of the first player device and a virtual location of the first player in the SVE 400.

Based on a determined player status associated with a second player in the SVE 400, a sensory interactivity parameter of the second player may be modified to change one or more of a visibility 406, an audibility 408, and a tangibility 410 of a second player avatar 404 associated with the second player in the SVE 400 in the POV of the first player. For example, as shown by FIGS. 4A-4C, modifying the visibility 406 of the second player avatar 404 may include modifying a transparency value of the second player avatar 404 in the POV of the first player. In the example of FIG. 4A, a default transparency value 414 may be translucent such that the second player avatar 404 is visible to the first player in the SVE 400 without completely obstructing a view by the first player of other elements in the SVE 400 behind the second player avatar 404, such as other virtual persons 402 for example. As shown by FIG. 4B, based on a player status of the second player, the transparency value 416 may be modified to be opaque to the first player in the SVE 400, thereby making the second player avatar 404 more prominent but also potentially blocking other elements in the SVE 400. Alternatively or in addition, as shown by FIG. 4C, the transparency value 416 may be modified to be fully transparent, i.e., invisible, to the first player in the SVE 400. Additional modifications to the visibility 406 may include changing an appearance of the avatar 404 to be ghosted, faded, lacking color, lacking detail, being an outline, and/or being a pair of hands without a body, for example.

In some embodiments, the visibility 406 or other sensory interactivity parameters may indicate a status of the person the avatar 404 represents. For example, a high roller may appear "normal" (i.e., opaque), a lowerlevel player's club member may have a reduced visibility level, and a non-member may have a further reduced visibility level.

In some examples, the visibility 406 or other sensory interactivity parameters may affect a level of interactivity between players. For example, two fully opaque avatars may be able to see each other and interact (e.g., talk, exchange money, gamble together, touch, etc.), but an avatar that is completely transparent may not be seen by other players and may not be able to interact with other players at all. A completely transparent player also may not be able to use certain services, go into certain areas or use certain gaming services. For example, non-high roller players may be transparent and unable to gamble on high roller machines in a high roller area of the casino.

In some examples, the player status may be assigned by the casino or the operator of the system. For example, a celebrity entering the virtual casino may have a highest status so that everyone can see her, but only certain people may be visible to the celebrity, such as members of the celebrity's club, high rollers or other VIP members. Low status members therefore may need to perform certain actions to raise their status so that the celebrity can see and interact with them.

Players may also choose to modify their visibility as they walk through the casino, e.g., to keep their status anonymous for privacy, security, legal, personal preference, or other reasons, and can choose to selectively reveal or hide their status. This option may be reserved for specific status levels, such as high rollers or celebrities. This could be a benefit for the highest status at a casino.

In some embodiments, a change in status and visibility may have a time limit. For example, a person might win a bonus and become less transparent and therefore can interact with a celebrity or use the high roller area for 15 minutes, before returning to the more transparent state. In some examples, transparent avatars may be capable of moving through other avatars and other avatars can move through them, such that there is no collision between them. In some examples, as avatars become less transparent, the avatars may be able to virtually contact other avatars, e.g., to perform high fives, hugs, or other social activities.

In some embodiments the system may inform the player of their transparency status. The indication may be simple, such as a visible to indicate status and which people can see them, which may be associated with different avatars in the SVE. In some embodiments, a player may be able to see a transparency level or interactivity level of their own hands to indicate their status.

In some embodiments, visibility levels may use color to indicate status. For example, high status people may be in full color while lower status people may be less saturated, or in black and white.

Similarly, as shown by FIGS. 4A-4C, modifying the audibility 408 of the second player avatar 404 may include modifying an audibility value of the second player avatar 404 in the POV of the first player. In the example of FIG. 4A, a default audibility value 420 may permit the second player avatar 404 to audibly interact, e.g., speak, with the first player in the POV of the first player in the SVE 400. As shown by FIG. 4B, based on a player status of the second player, the audibility value 422 may be modified to allow the first player to hear other environmental interactions by the second player avatar 404 in the SVE 404, such as footsteps or game interaction sounds, thereby enhancing a sense of immersion for the first player in the SVE 400. Alternatively or in addition, as shown by FIG. 4C, the audibility value 424 may be modified to be fully silent to the first player in the SVE 400. In some examples, enabling the second player avatar to audibly interact with the first player may be limited to a predetermined audible frequency range, e.g., low, mid-range, or high tones, which may be more or less prominent and/or distracting to different individuals.

Modifying the tangibility 410 of the second player avatar 404 may include modifying haptic feedback value of the second player avatar 404 in the POV of the first player. In the example of FIG. 4A, a default haptic feedback value 426 may be permit the second player avatar 404 to receive haptic feedback, e.g., vibration or force feedback, when a first player avatar 405 comes into virtual contact with the second player avatar 404 in the SVE 400. As shown by FIG. 4B, based on a player status of the second player, the haptic feedback value 428 may be modified to provide stronger feedback, such as providing sufficient force feedback to prevent the first player avatar 405 from overlapping the second player avatar 404, thereby making the second player avatar 404 seem solid to the first player. Alternatively or in addition, as shown by FIG. 4C, the haptic feedback value 430 may be modified to allow the first player avatar 405 to pass through the second player avatar 404 in the SVE 400 with no haptic feedback at all.

The visibility 406, audibility 408, and/or tangibility 410 of the second player avatar 404 and other virtual persons 402 may be modified independently of each other, and/or in different combinations. For example, a second player avatar may be completely transparent but may have a low level of environmental audibility and tangibility, such that the first player may detect the presence of the second player avatar 404 but without being distracted by the second player avatar 404. Alternatively, or in addition, the visibility, audibility, and/or tangibility of the second player avatar 404 may override the first player's default preferences, such as if the second player avatar 404 is associated with a celebrity or a promoted individual.

In some examples, the player status of the second player may be based on play activity 434 of the second player, such as the second player initiating an active gaming session 436 in the SVE 400, and/or a win amount by the second player meeting a predetermined win threshold. For example, the second player avatar 404 may be invisible by default to a first player moving around the SVE 400, but the second player initiating a game session at a particular virtual machine in the SVE 400 may cause the second player avatar 404 to become visible, audible, and/or tangible, to indicate that the particular virtual machine is now occupied. Alternatively or in addition, the sensory interactivity parameter of the second player may be further based on a player status of the first player and/or other players, as desired.

Figure 5A:
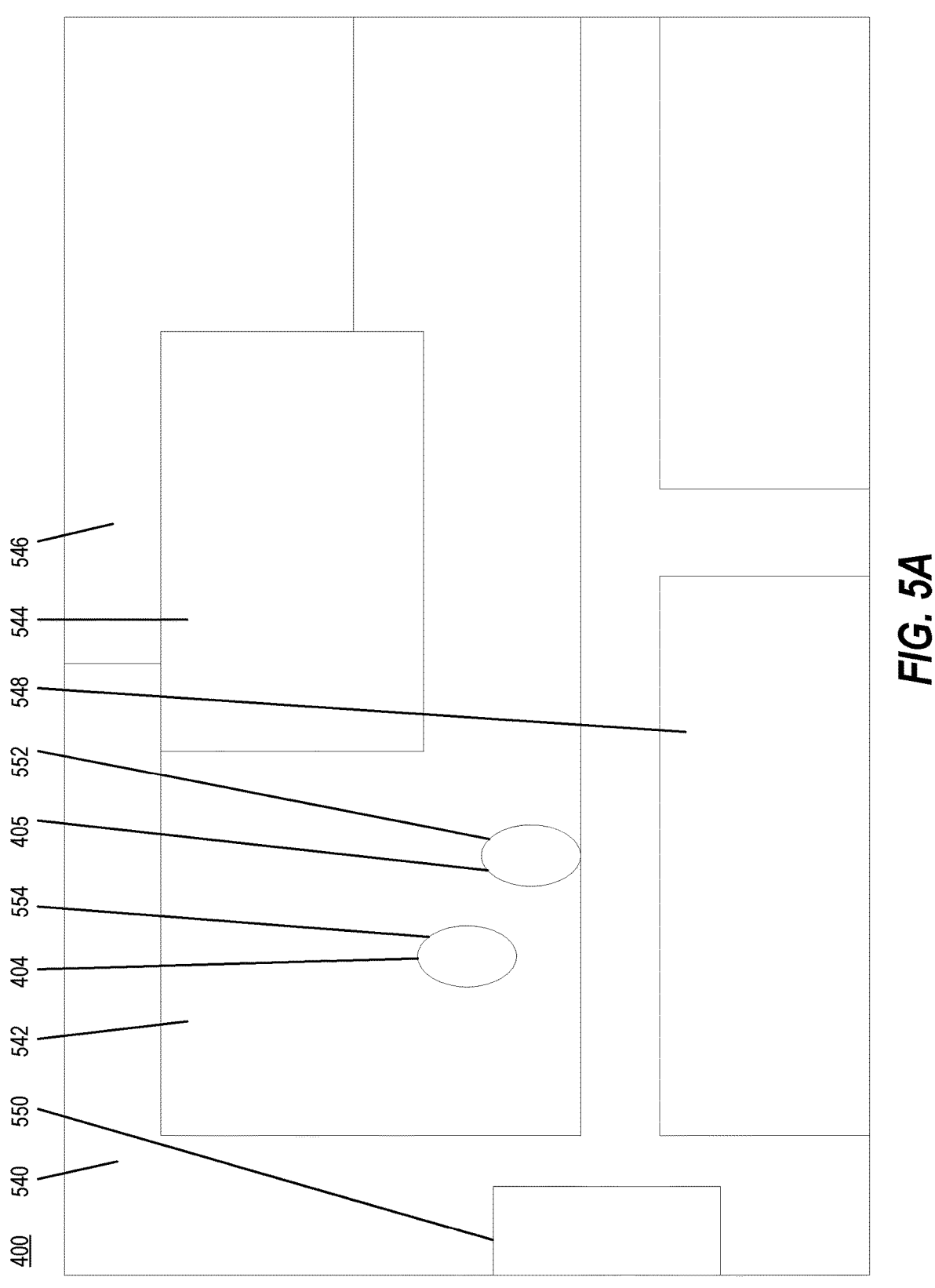
FIGS. 5A-5D illustrate changing sensory interactivity parameters based on location, according to some embodiments.
Figure 5B:
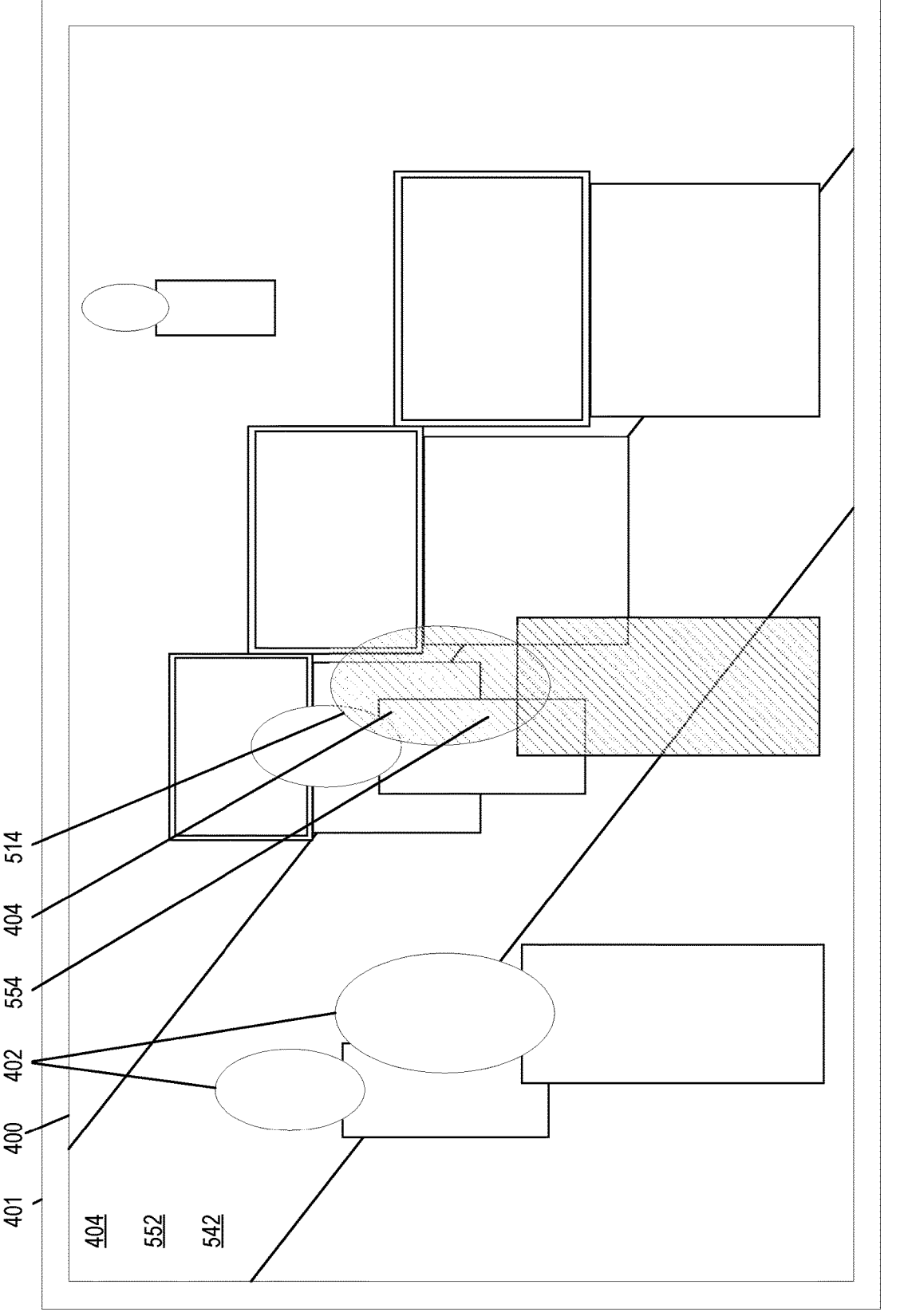

In some examples, the player status of the second player may be further based on a virtual location of the second player within the SVE 400. In this regard, FIGS. 5A-5D illustrate changing sensory interactivity parameters based on location, according to some embodiments. FIG. 5A illustrates a top-down view of the SVE 400 showing a virtual casino floor 540 with different gaming and non-gaming areas, e.g., slot floor 542, poker room 544, sports book 546, restaurant 548, check-in desk 550, etc., with the first player avatar 405 at a first player location 552 and the second player avatar 404 in a second player location 554, i.e., in the slot floor 542 location. FIG. 5B illustrates the SVE 400 being displayed on the display device 401 associated with the first player from a POV of the first player location 552. In this example, the second player avatar 404 may have translucent visibility 514 when not in an active gaming session.

Figure 5C:
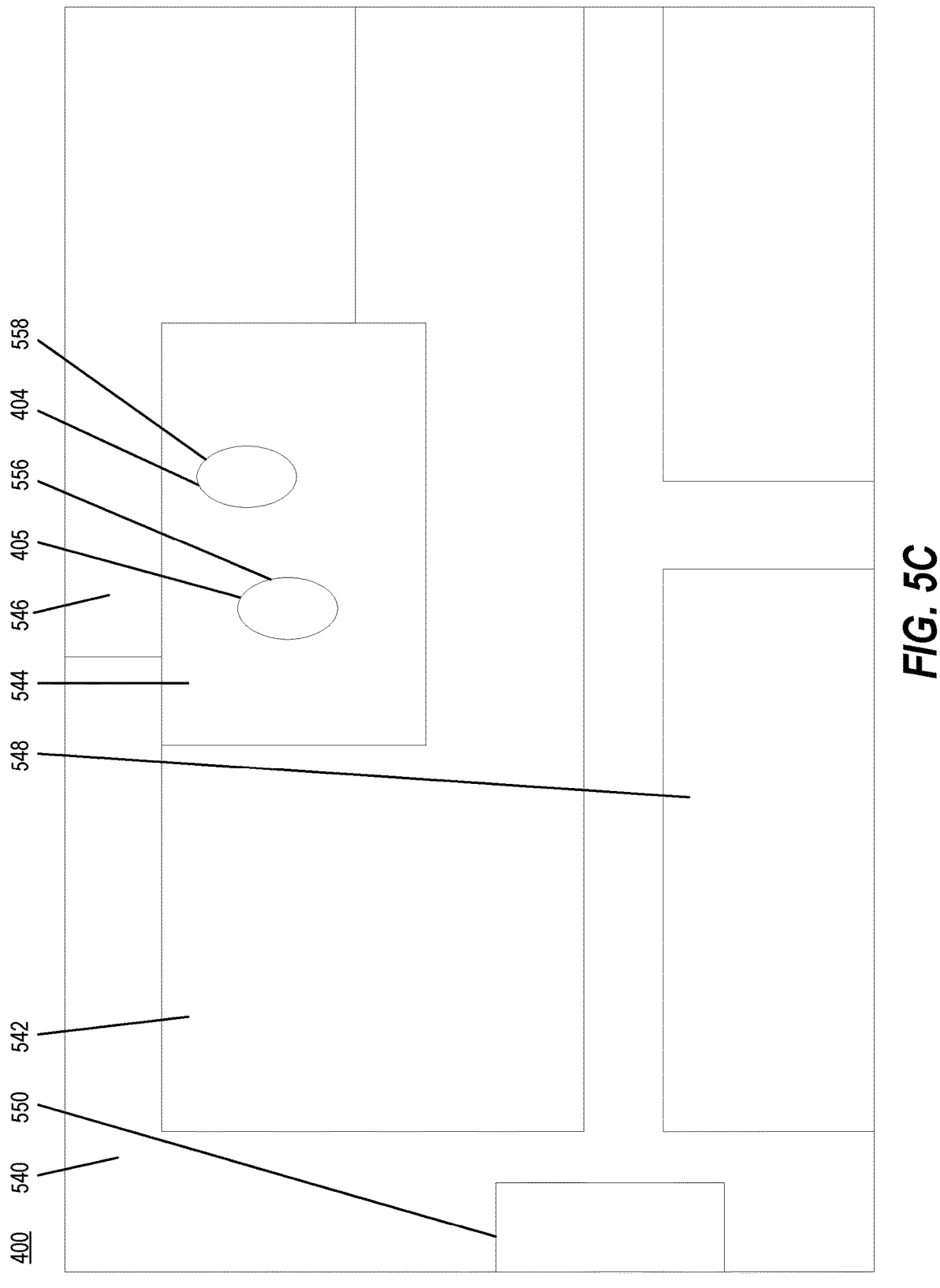
Figure 5D:
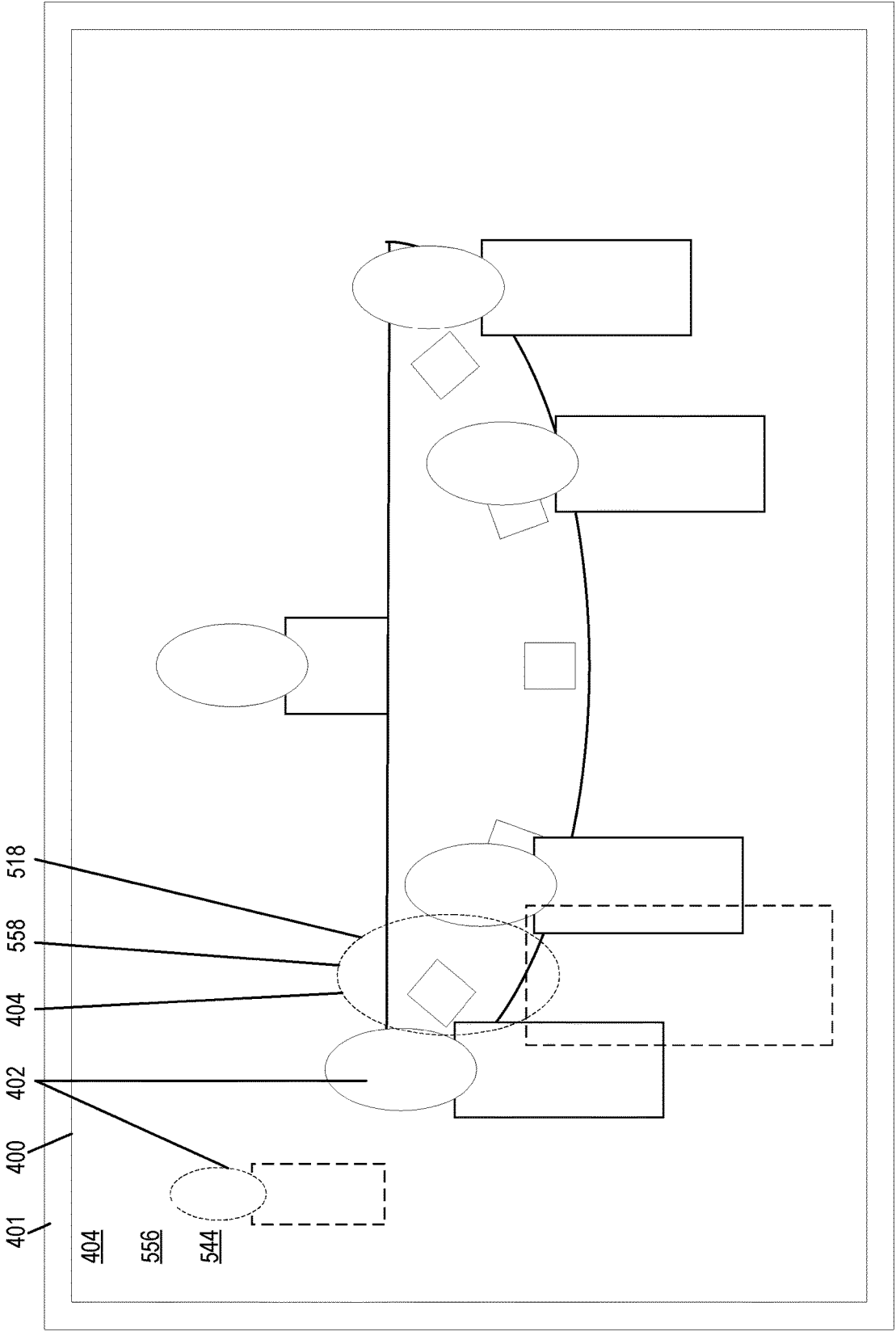

FIG. 5C illustrates the first player avatar 405 moving to a new first player location 556 and the second player avatar 404 moving to a new second player location 558, e.g., to the poker room 544 in this example. In this example, FIG. 5D illustrates the SVE 400 being displayed on the display device 401 a POV of the new first player location 556, where the second player avatar 404 may now have a fully transparent visibility 518 when not in an active gaming session. In this manner, an observer/non-player in the poker room 544 may have lower sensory interactivity than in the slot floor 542 or other areas. These sensory interactivity levels may be customized as desired.

Figure 6A:
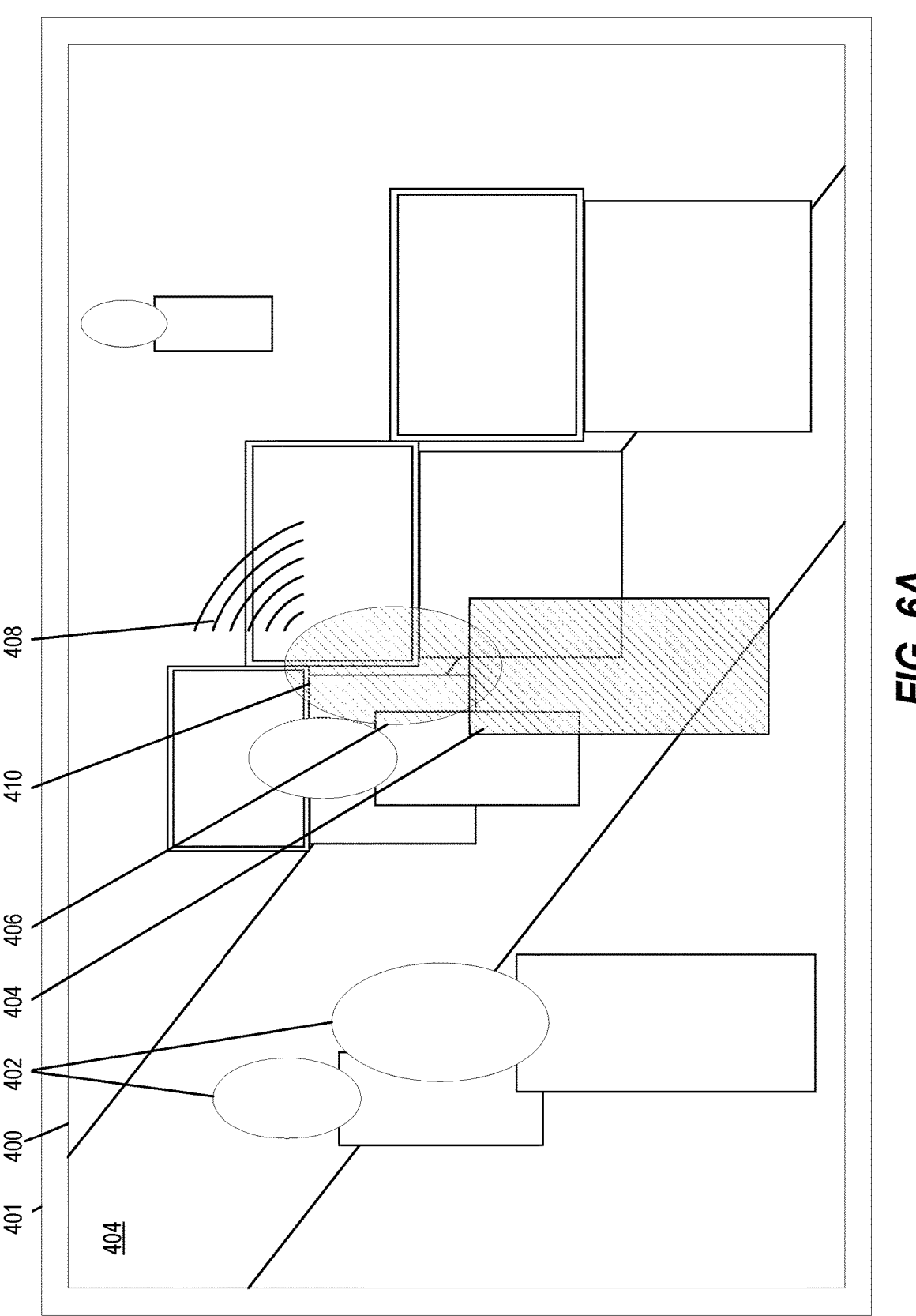
FIGS. 6A-6D illustrate reciprocal views of the SVE 400 being displayed on display devices associated with the first and second players from their respective POVs, according to some embodiments.
Figure 6B:
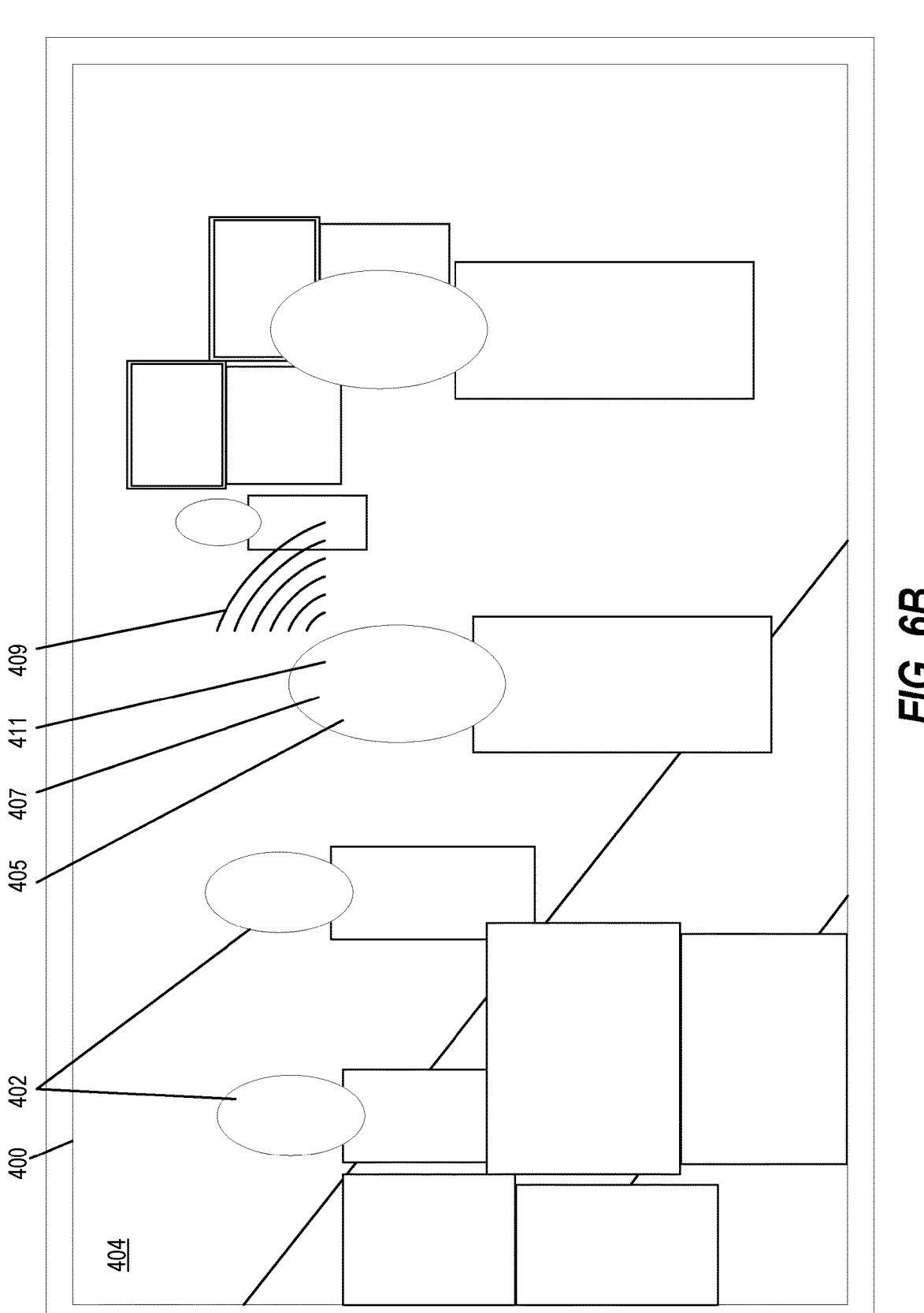
Figure 6C:
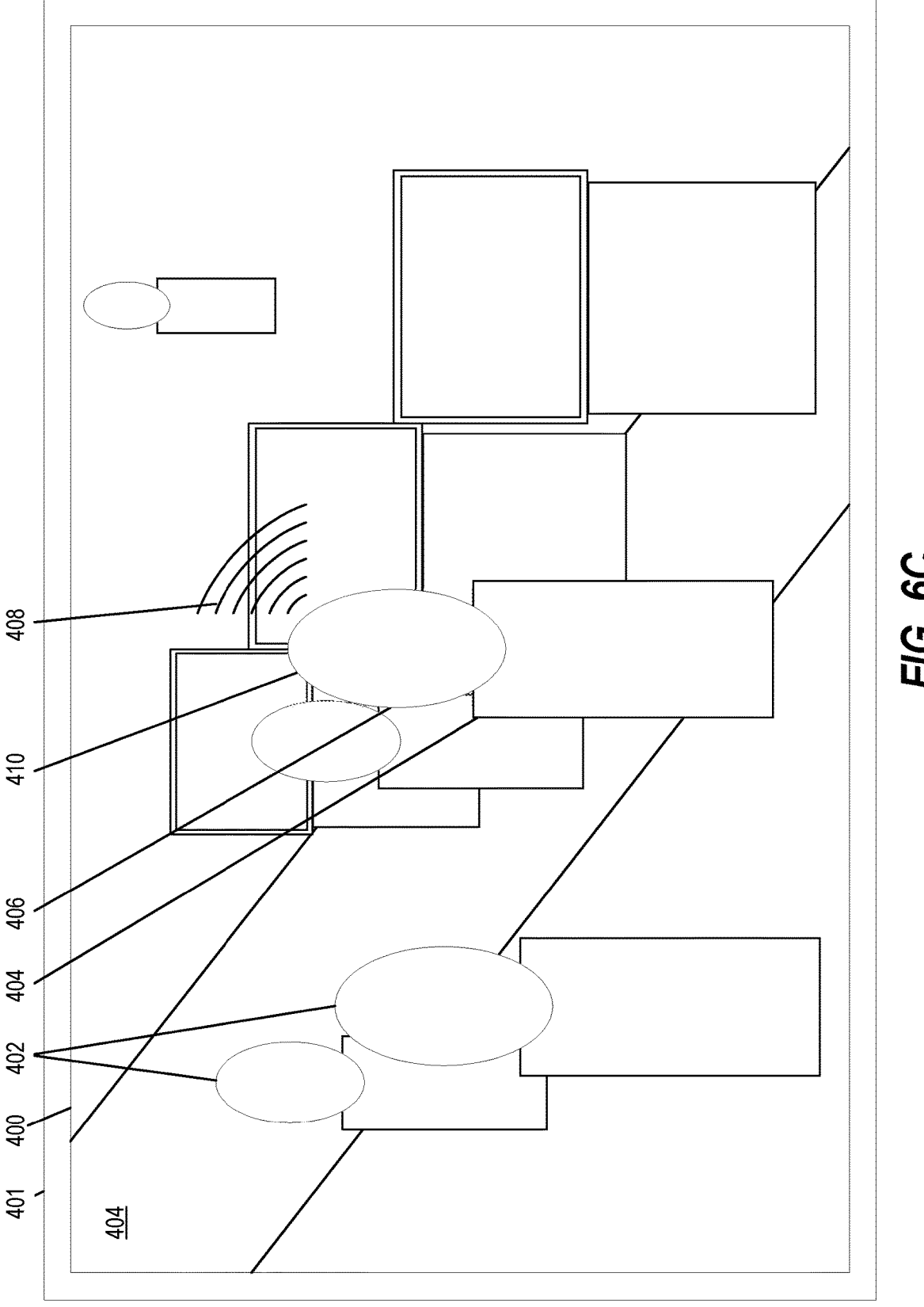
Figure 6D:
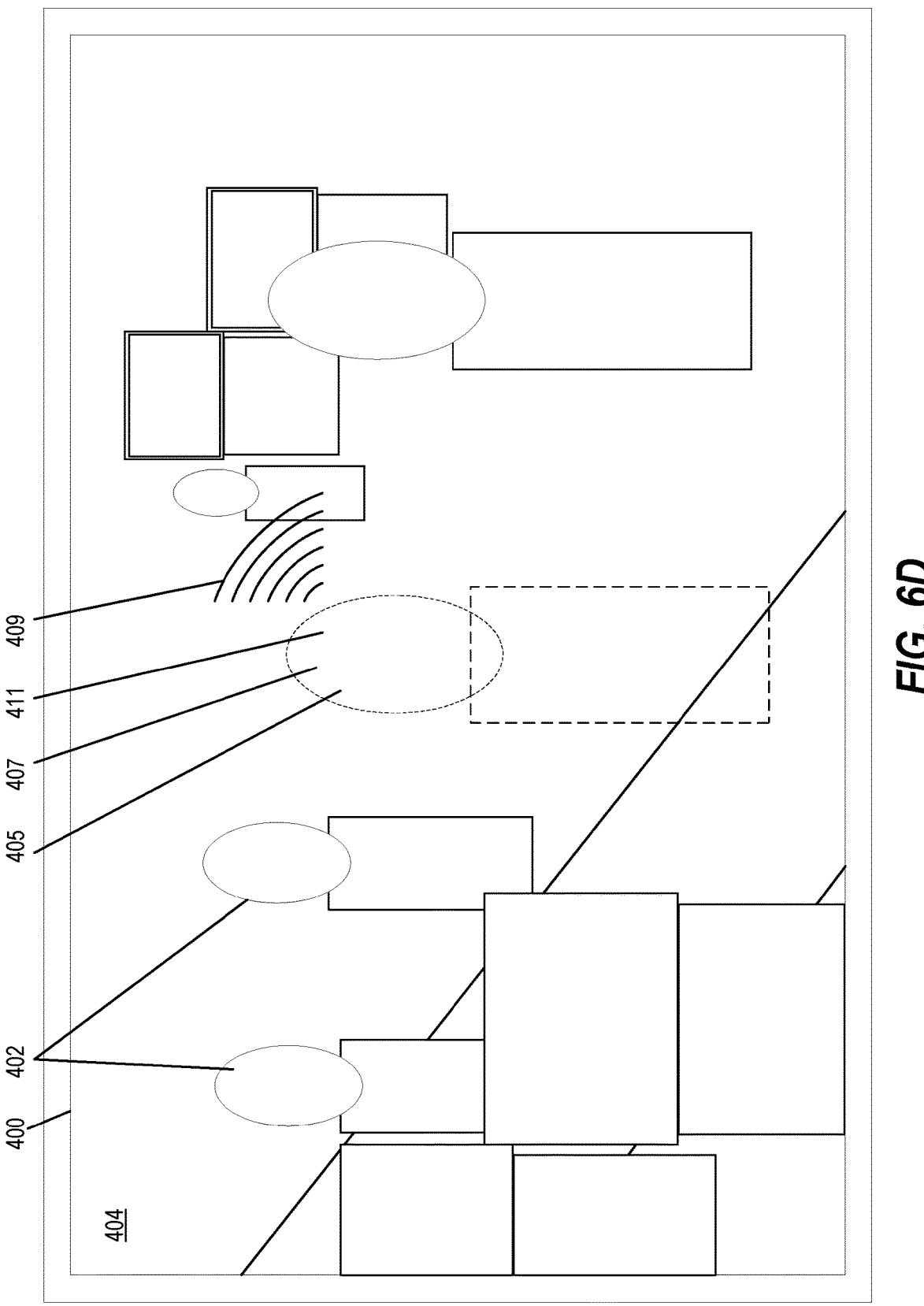

In some examples, sensory interactivity parameters may be modified for both the first player and the second player based on the player status of the first player and/or the player status of the second player. In this regard, FIGS. 6A-6D illustrate reciprocal views of the SVE 400 being displayed on display devices associated with the first and second players from their respective POVs. For example, FIG. 6A illustrates a view of the SVE 400 in a POV of the first player, with default sensor interactivity parameters, e.g. visibility 407, an audibility 409, and a tangibility 411, etc., for the second player avatar 404, and FIG. 6B illustrates a view of the SVE 400 in a POV of the second player, with default sensor interactivity parameters for the first player avatar 405. As shown by FIG. 6C, based on a determined player status associated with the first player and/or the second player in the SVE 400, the sensory interactivity parameter of the second player may be modified to change one or more of the visibility 406, an audibility 408, and a tangibility 410 of the second player avatar 404 associated with the second player in the SVE 400 in the POV of the first player. Likewise, as shown by FIG. 6D, based on a determined player status associated with the first player and/or the second player in the SVE 400, the sensory interactivity parameter of the first player may be modified to change one or more of the visibility 407, an audibility 409, and a tangibility 411 of the first player avatar 405 associated with the first player in the SVE 400 in the POV of the second player.

FIG. 7 is a flowchart illustrating operations 700 of systems/methods for facilitating embodiments described herein. The operations 700 may be performed by one or more processor circuits of one or more computing devices, such as any of the computing devices described herein, for example.

The operations 700 may include providing, by a processor circuit, a real-time environmental model of a shared virtual environment (SVE) comprising a plurality of virtual persons in a virtual gaming environment (Block 702). The operations 700 may further include transmitting display data corresponding to the SVE to a first player device worn by a first player, the display data comprising user display data that causes a display device in the first player device to render a portion of the SVE from a point of view (POV) of the first player based on a virtual orientation of the first player device and a virtual location of the first player in the SVE (Block 704).

The operations 700 may further include determining, by the processor circuit, a player status associated with a second player in the SVE (Block 706). The operations 700 may further include, based on the player status of the second player, modify, by the processor circuit, a sensory interactivity parameter of the second player to modify at least one of a visibility, an audibility, and a tangibility a second player avatar associated with the second player in the SVE in the POV of the first player (Block 708).

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet or other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

22

What is claimed is:

1. A system comprising:
a processor circuit; and
a memory comprising non-transitory machine-readable instructions that, when executed by the processor circuit, cause the processor circuit to:
provide a real-time environmental model of a shared virtual environment (SVE) comprising a plurality of virtual persons in a virtual gaming environment;
transmit display data corresponding to the SVE to a first player device worn by a first player, the display data comprising user display data that causes a display device in the first player device to render a portion of the SVE from a point of view (POV) of the first player based on a virtual orientation of the first player device and a virtual location of the first player in the SVE;
determine a player status associated with a second player in the SVE; and
based on the player status of the second player, modify a sensory interactivity parameter of the second player to modify at least one of a visibility, an audibility, and a tangibility a second player avatar associated with the second player in the SVE in the POV of the first player.

2. The system of claim 1, wherein modification of a visibility of the second player avatar comprises modifying a transparency value of the second player avatar in the POV of the first player.

3. The system of claim 1, wherein modification of an audibility of the second player avatar comprises enabling the second player avatar to audibly interact with the first player in the POV of the first player.

4. The system of claim 3, wherein modification of the audibility of the second player avatar further comprises enabling the second player avatar to audibly interact with the first player in the POV of the first player in a predetermined audible frequency range.

5. The system of claim 1, wherein modification of a tangibility the second player avatar comprises enabling the second player avatar to provide haptic feedback to the first player in the POV of the first player.

6. The system of claim 1, wherein player status of the second player is based on play activity of the second player.

7. The system of claim 6, wherein the play activity of the second player comprises initiation of an active gaming session in the SVE.

8. The system of claim 6, wherein the play activity of the second player comprises a win amount of the second player in the SVE meeting a predetermined win threshold.

9. The system of claim 1, wherein the player status of the second player is further based on a virtual location of the second player within the SVE.

10. The system of claim 9, wherein the player status of the second player in a first virtual location within the SVE is a first player status associated with a first sensory interactivity parameter value, and
wherein the player status of the second player in a second virtual location within the SVE is a second player status associated with a second sensory interactivity parameter value different from the first sensory interactivity parameter value.

11. The system of claim 1, wherein modification of the sensory interactivity parameter of the second player is further based on a player status of the first player.

12. The system of claim 11, wherein the instructions further cause the processor circuit to, based on the player status of the first player and the player status of the second player, modify a sensory interactivity parameter of the first player to modify at least one of a visibility, an audibility, and a tangibility a first player avatar associated with the first player in the SVE in a POV of the second player.

13. A wearable gaming device comprising:

a frame;

a display device coupled to the frame to dispose the display device in a field of view (FOV) of a first player;

a processor circuit; and a memory comprising non-transitory machine-readable instructions that, when executed by the processor circuit, cause the processor circuit to:

provide a real-time environmental model of a shared virtual environment (SVE) comprising a plurality of virtual persons in a virtual gaming environment;

receive display data corresponding to the SVE, the display data comprising user display data that causes the display device to render a portion of the SVE from a point of view (POV) of the first player based on a virtual orientation of the frame and a virtual location of the first player in the SVE;

determine a player status associated with a second player in the SVE; and based on the player status of the second player, modify a sensory interactivity parameter of the second player to modify at least one of a visibility, an audibility, and a tangibility a second player avatar associated with the second player in the SVE in the POV of the first player.

14. The wearable gaming device of claim 13, wherein modification of a visibility of the second player avatar comprises modifying a transparency value of the second player avatar in the POV of the first player.

15. The wearable gaming device of claim 13, wherein modification of an audibility of the second player avatar comprises enabling the second player avatar to audibly interact with the first player in the POV of the first player.

16. The wearable gaming device of claim 15, wherein modification of the audibility of the second player avatar further comprises enabling the second player avatar to audibly interact with the first player in the POV of the first player in a predetermined audible frequency range.

17. The wearable gaming device of claim 13, wherein modification of a tangibility the second player avatar comprises enabling the second player avatar to provide haptic feedback to the first player in the POV of the first player.

18. The wearable gaming device of claim 13, wherein the player status of the second player is based on play activity of the second player.

19. The wearable gaming device of claim 13, wherein the player status of the second player is further based on a virtual location of the second player within the SVE.

20. A method comprising:

providing, by a processor circuit, a real-time environmental model of a shared virtual environment (SVE) comprising a plurality of virtual persons in a virtual gaming environment;

transmitting display data corresponding to the SVE to a first player device worn by a first player, the display data comprising user display data that causes a display device in the first player device to render a portion of the SVE from a point of view (POV) of the first player based on a virtual orientation of the first player device and a virtual location of the first player in the SVE;

determining, by the processor circuit, a player status associated with a second player in the SVE; and based on the player status of the second player, modify, by the processor circuit, a sensory interactivity parameter of the second player to modify at least one of a visibility, an audibility, and a tangibility a second player avatar associated with the second player in the SVE in the POV of the first player.

* * * * *